US011892136B2

(12) United States Patent
Woo et al.

(10) Patent No.: US 11,892,136 B2
(45) Date of Patent: Feb. 6, 2024

(54) VEHICLE LAMP

(71) Applicant: SL Corporation, Daegu (KR)

(72) Inventors: Jun Woo Woo, Gyeongsan-si (KR); Jin Ho Jo, Gyeongsan-si (KR); Dong Hyun Go, Gyeongsan-si (KR); Nak Jung Choi, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/297,272

(22) Filed: Apr. 7, 2023

(65) Prior Publication Data

US 2023/0417384 A1 Dec. 28, 2023

(30) Foreign Application Priority Data

Jun. 28, 2022 (KR) ........................ 10-2022-0079173

(51) Int. Cl.
*F21S 41/24* (2018.01)
*F21S 41/143* (2018.01)
*F21S 41/27* (2018.01)
*F21S 41/151* (2018.01)

(52) U.S. Cl.
CPC ............. *F21S 41/24* (2018.01); *F21S 41/143* (2018.01); *F21S 41/151* (2018.01); *F21S 41/27* (2018.01)

(58) Field of Classification Search
CPC ........ F21S 41/151; F21S 41/143; F21S 41/24; F21S 41/27
See application file for complete search history.

(56) References Cited

U.S. PATENT DOCUMENTS

2008/0247182 A1* 10/2008 Yasuda .................. F21V 29/74 362/465
2022/0003375 A1* 1/2022 Sugiyama ............ F21S 41/663

* cited by examiner

*Primary Examiner* — Karabi Guharay
(74) *Attorney, Agent, or Firm* — United One Law Group LLC; Kongsik Kim; Jhongwoo Peck

(57) ABSTRACT

A vehicle lamp forms a predetermined beam pattern using a plurality of lamp modules arranged in at least one direction. Each of the plurality of lamp modules includes a light source unit that generates light; an optical unit that is disposed in front of the light source unit and transmits the light from the light source unit so that at least a portion of the light incident to an incident surface of the optical unit is output through an exit surface thereof to form the predetermined beam pattern; and an optical path adjustment unit that guides the light generated from the light source unit to the optical unit by adjusting paths of the light. The exit surface of the optical unit of one of the plurality of lamp modules is disposed more forward than the exit surface of the optical unit of another one of the plurality of lamp modules.

16 Claims, 20 Drawing Sheets

VEHICLE LAMP

CROSS-REFERENCE TO RELATED APPLICATION

This application claims priority from Korean Patent Application No. 10-2022-0079173, filed on Jun. 28, 2022, which is incorporated herein by reference in its entirety.

BACKGROUND

1. Technical Field

The present disclosure relates to a vehicle lamp, and more particularly, to a vehicle lamp capable of realizing a slim form factor and preventing the formation of an unnecessary shadow area.

2. Description of the Related Art

Generally, a vehicle includes various types of vehicle lamps having an illumination function and a signaling function. The illumination function enables the driver of the vehicle to easily detect objects around the vehicle while driving in low-light conditions (e.g., at night), and the signaling function is used to inform other vehicles or road users of the vehicle's driving state.

For example, a headlamp and a fog lamp are designed primarily for the illumination function, and a turn signal lamp, a tail lamp and a brake lamp are designed primarily for the signaling function. The installation standards and specifications of these vehicle lamps are prescribed by law so that each function can be fully satisfied.

Recently, the aesthetic aspect that consumers feel, through design improvement, as well as the functional aspect of helping safe driving by securing the driver's visibility, which is the basic role of vehicle lamps, greatly affect the purchases decision for a vehicle.

Therefore, research is being actively conducted to improve the exterior design of a vehicle lamp by making the vehicle lamp have a slimmer exterior design and to form an optimal beam pattern while realizing a slim form factor using a plurality of lamp modules.

Here, when a beam pattern is formed via a plurality of lamp modules, if a space is formed between the plurality of lamp modules due to a manufacturing tolerance or an assembly tolerance, an unnecessary shadow area is formed. In this regard, it is required to come up with ways to prevent the formation of the unnecessary shadow area while realizing a slim exterior design with a plurality of lamp modules.

SUMMARY

Aspects of the present disclosure provide a vehicle lamp which prevents the formation of an unnecessary shadow area due to an assembly tolerance or a manufacturing tolerance while realizing a slim exterior design by arranging a plurality of lamp modules.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

An aspect of the present disclosure provides a vehicle lamp for forming a predetermined beam pattern using a plurality of lamp modules arranged in at least one direction.

Each of the plurality of lamp modules may include a light source unit that generates light; an optical unit that is disposed in front of the light source unit and transmits the light from the light source unit so that at least a portion of the light incident to an incident surface of the optical unit is output through an exit surface thereof to form the predetermined beam pattern; and an optical path adjustment unit that guides the light generated from the light source unit toward the optical unit by adjusting paths of the light. In particular, the exit surface of the optical unit of one of the plurality of lamp modules may be disposed more forward than the exit surface of the optical unit of another one of the plurality of lamp modules.

The plurality of lamp modules may be arranged in an up-down direction.

The optical unit may be tilted such that one of both sides in the at least one direction is disposed more forward than the other of the both sides.

The optical unit may include a plurality of incident lenses which form the incident surface and a plurality of exit lenses which form the exit surface and from which light incident to the plurality of incident lenses is output. Incident and exit lenses corresponding to each other among the plurality of incident lenses and the plurality of exit lenses may be staggered with respect to each other in the arrangement direction of the plurality of lamp modules. Both sides of the incident and exit lenses corresponding to each other may be asymmetrical with respect to a reference line that passes in a front-back direction through a focal point of the incident and exit lenses corresponding to each other. As such, in one of the incident and exit lenses corresponding to each other, a portion thereof disposed on a first side with respect to the reference line may be larger than a portion thereof disposed on a second side with respect to the reference line, and in the other of the incident and exit lenses corresponding to each other, a portion thereof disposed on the second side with respect to the reference line may be larger than a portion thereof disposed on the first side with respect to the reference line.

Each of the plurality of lamp modules may further include a first holder that supports the optical path adjustment unit and a second holder that is coupled to the first holder and supports the optical unit. One of the first holder and the second holder may include at least one coupling rib, and the other thereof may include at least one rib groove into which the at least one coupling rib is inserted. The second holder may include a first sidewall portion and a second sidewall portion that support both sides of the optical unit, and at least one of both ends of a front end of the first sidewall portion and a corresponding one of both ends of a front end of the second sidewall portion in the arrangement direction of the plurality of lamp modules may be separated from each other. Further, at least one of the first sidewall portion and the second sidewall portion may have an opening through which a portion of the light guided by the optical path adjustment unit passes.

The vehicle lamp may further include a light guide unit that guides the light emitted from the plurality of lamp modules. The light guide unit may have one or more opening apertures, through which a portion of the light guided by the optical path adjustment unit passes, the one or more opening apertures being disposed around a passage aperture through which the light emitted from the plurality of lamp modules passes. The light guide unit may further include a diffusion portion for diffusing light that proceeds to the opening aperture.

The vehicle lamp may further include an auxiliary optical unit disposed between the optical units of adjacent lamp modules among the plurality of lamp modules. The auxiliary optical unit may be tilted such that one of both sides in the at least one direction is disposed more forward than the other of the both sides. The vehicle lamp may further include one or more frame portions to which both sides of the auxiliary optical unit disposed between the optical units of the adjacent lamp modules are connected.

The vehicle lamp according to the present disclosure may provide at least one of the following advantages. A slim exterior design can be realized by arranging a plurality of lamp modules, and an unnecessary shadow area formed due to a space between the lamp modules can be prevented. However, the effects of the present disclosure are not restricted to those set forth herein. The above and other effects of the present disclosure will become more apparent to one of ordinary skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
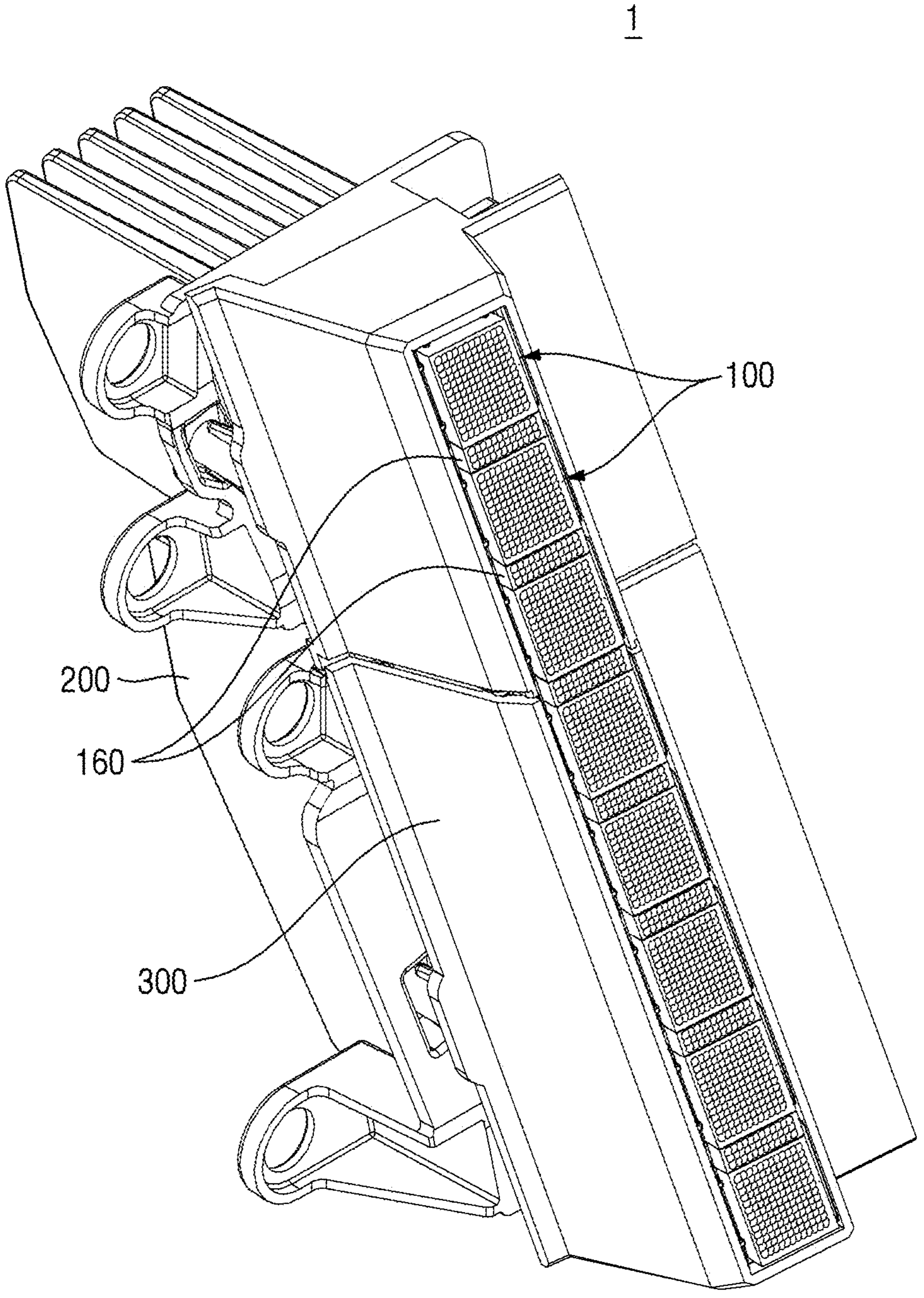
FIGS. 1 and 2 are perspective views of a vehicle lamp according to an embodiment of the present disclosure.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the disclosure.

The terminology used herein is for the purpose of describing particular embodiments only and is not intended to be limiting of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items.

Embodiments of the disclosure are described herein with reference to plan and cross-section illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but should be construed to include deviations in shapes that result, for example, from manufacturing. In the drawings, respective components may be enlarged or reduced in size for convenience of explanation.

Hereinafter, the preset disclosure will be described with reference to the drawings for describing vehicle lamps according to embodiments of the present disclosure.

Figure 2:
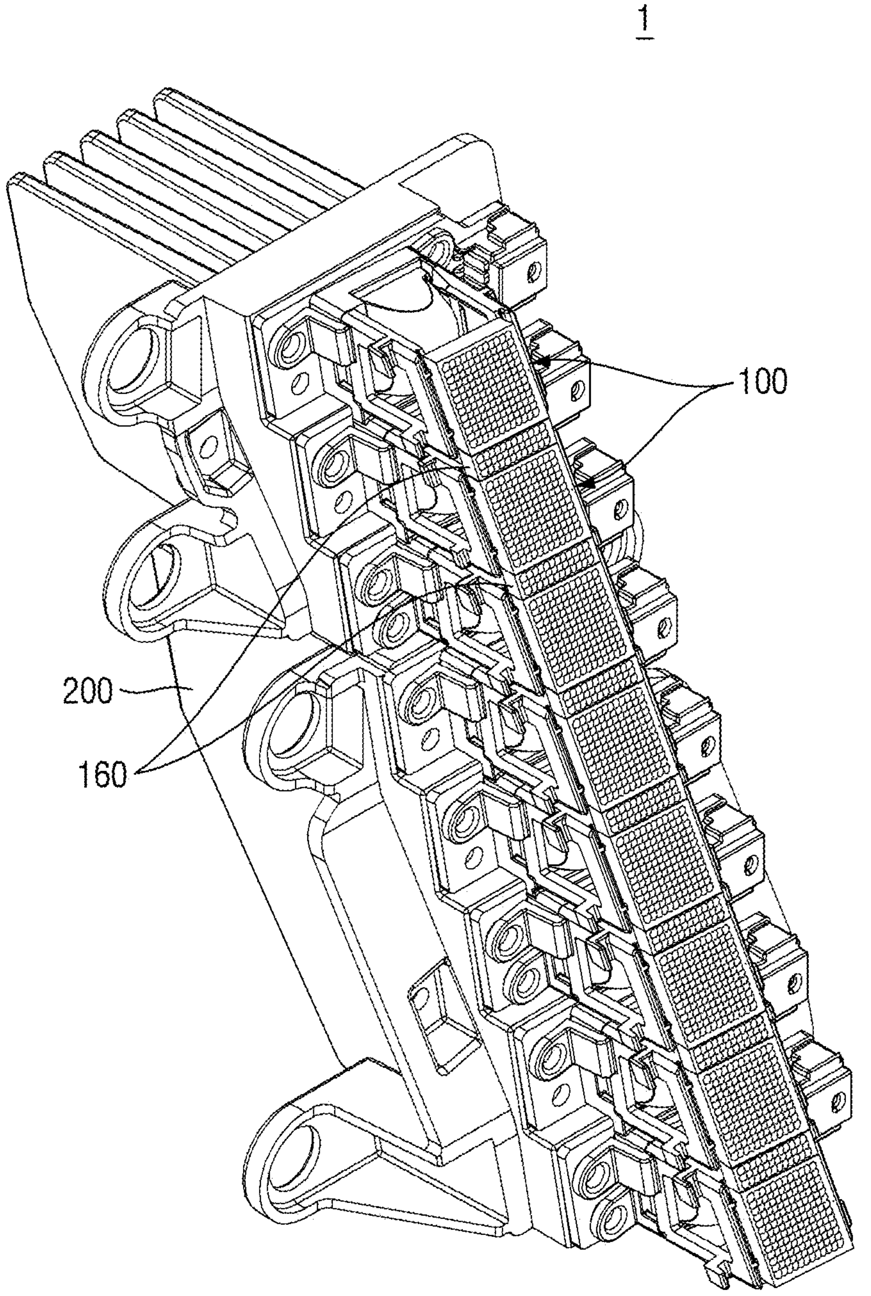
Figure 3:
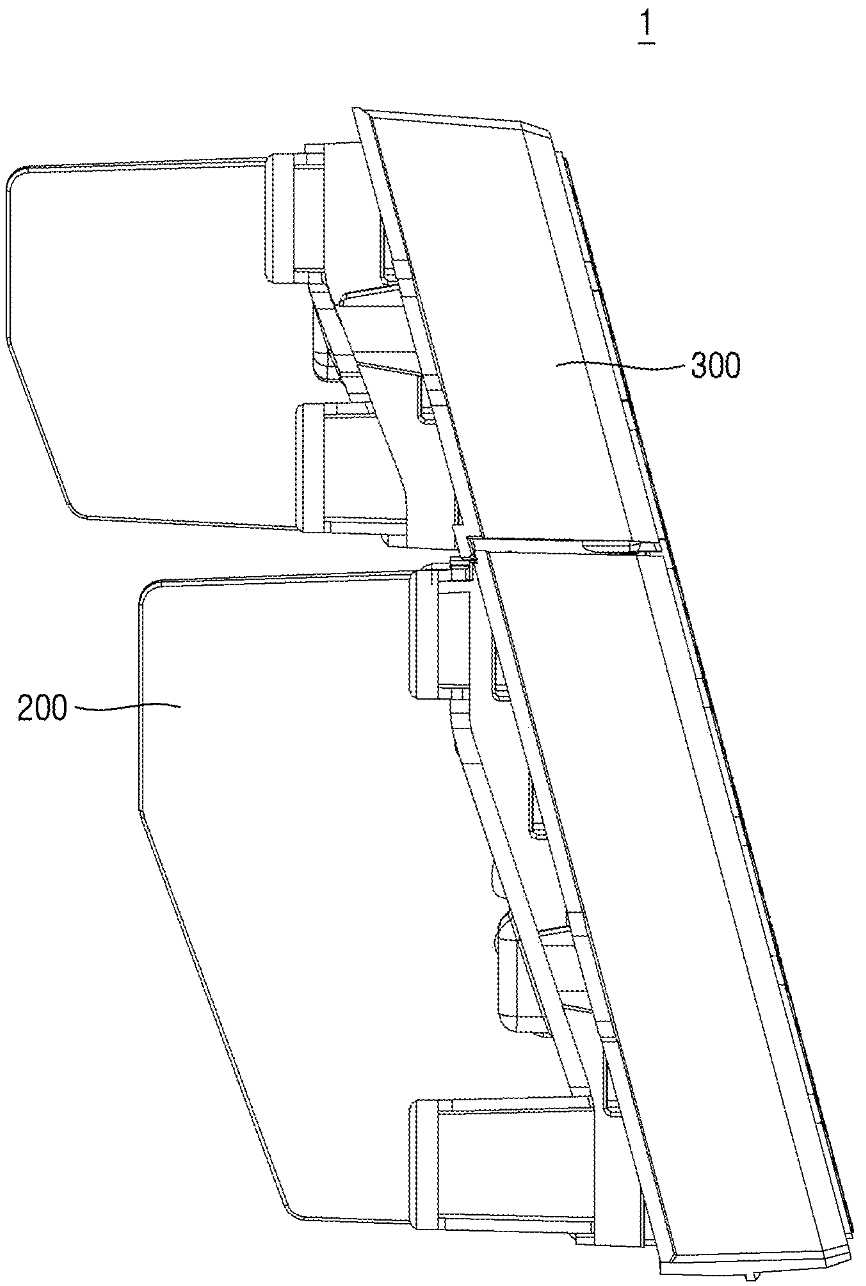
FIGS. 3 and 4 are side views of the vehicle lamp according to the embodiment of the present disclosure.
Figure 4:
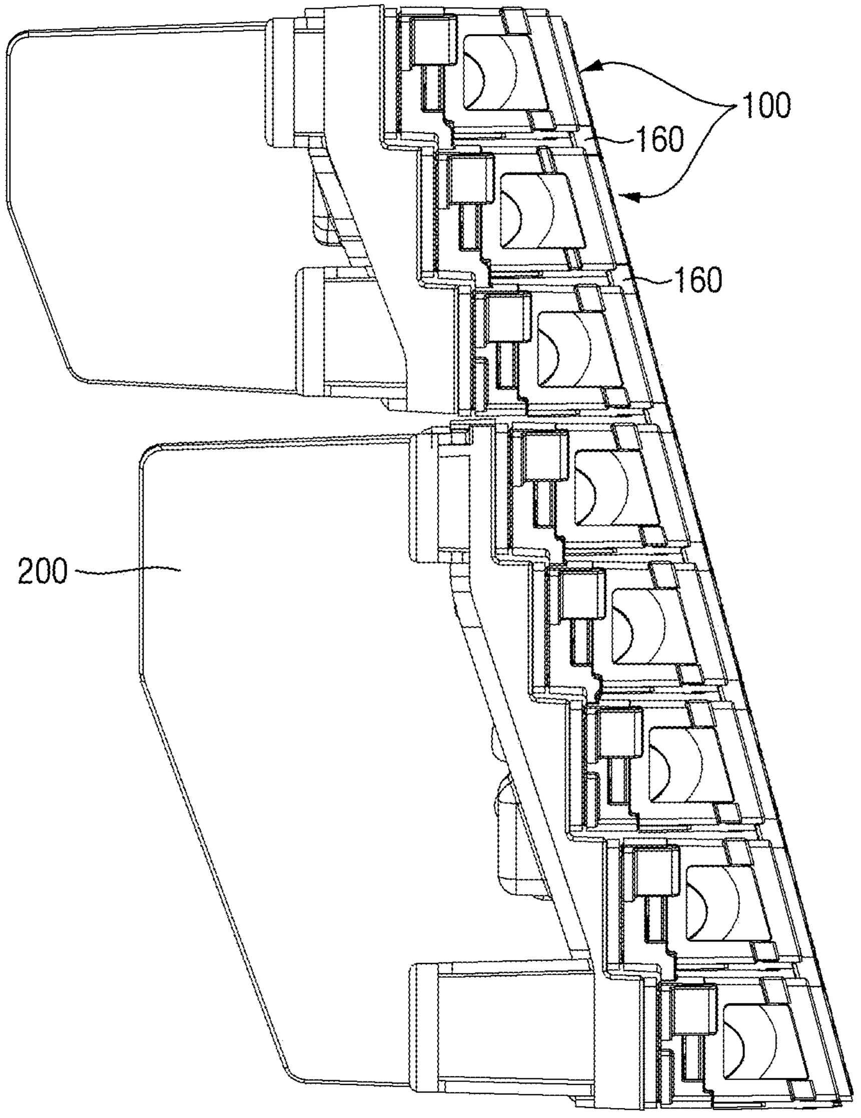
Figure 5:
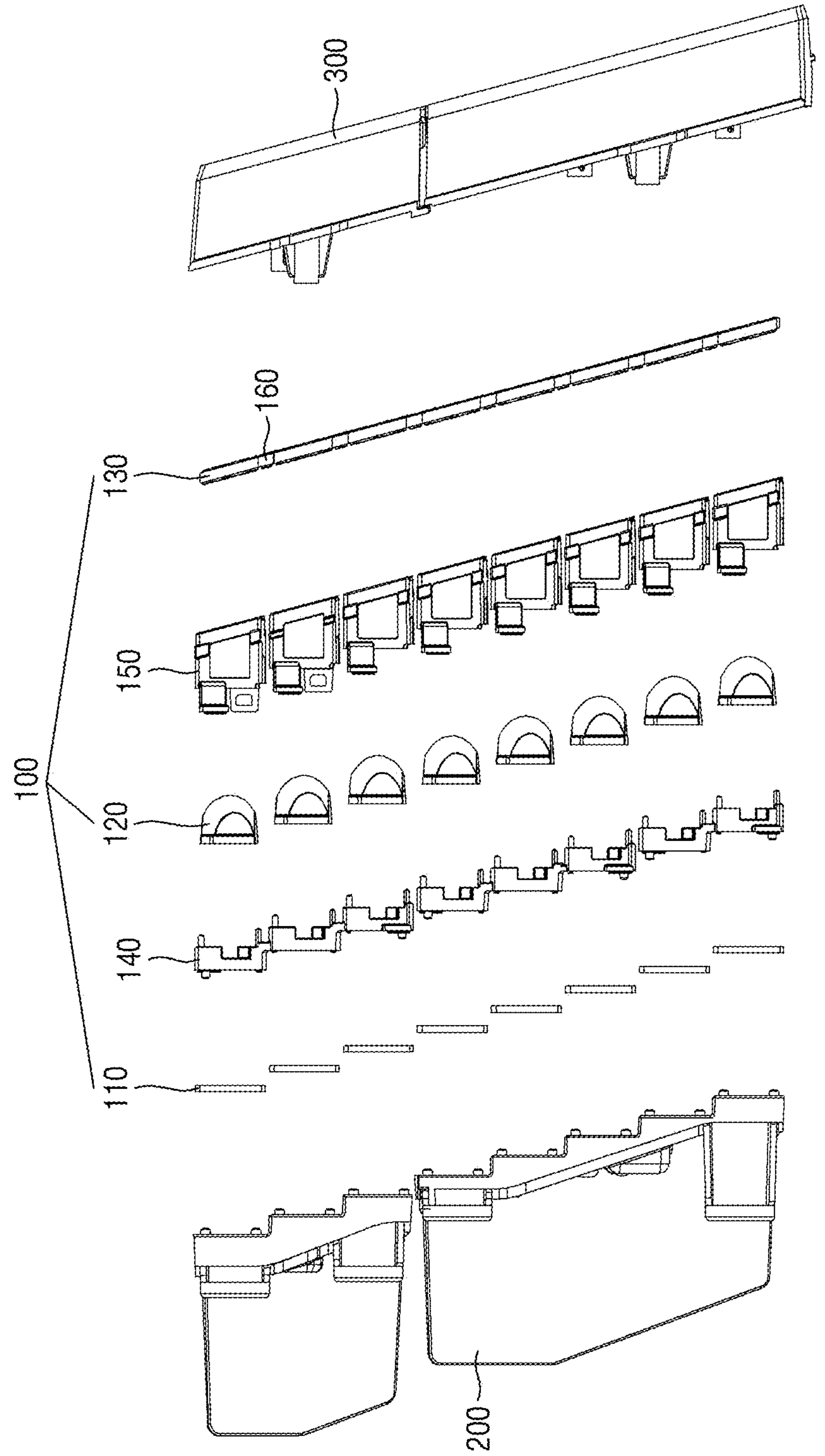
FIG. 5 is an exploded view illustrating a side of the vehicle lamp according to the embodiment of the present disclosure.
Figure 6:
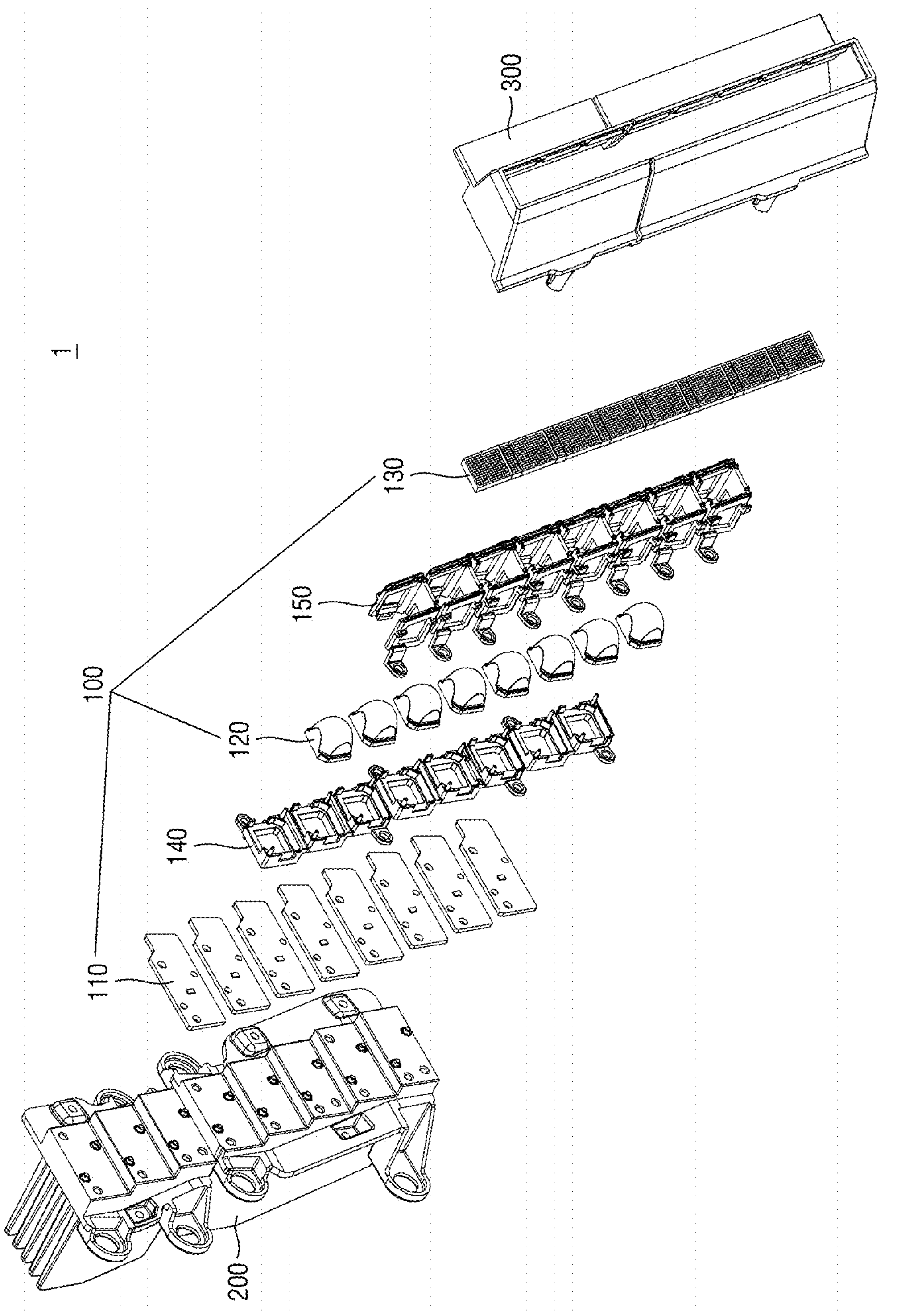
FIG. 6 is an exploded perspective view of the vehicle lamp according to the embodiment of the present disclosure.

FIGS. 1 and 2 are perspective views of a vehicle lamp 1 according to an embodiment of the present disclosure. FIGS. 3 and 4 are side views of the vehicle lamp 1 according to the embodiment of the present disclosure. FIG. 5 is an exploded view illustrating a side of the vehicle lamp 1 according to the embodiment of the present disclosure. FIG. 6 is an exploded perspective view of the vehicle lamp 1 according to the embodiment of the present disclosure. In FIGS. 2 and 4, the vehicle lamp 1 is shown with a light guide unit 300 omitted for description purposes.

Referring to FIGS. 1 through 6, the vehicle lamp 1 according to the embodiment of the present disclosure may include a plurality of lamp modules 100, and light distribution areas respectively formed by the lamp modules 100 may at least partially overlap with one another to form a beam pattern suitable for the use of the vehicle lamp 1 of the present disclosure.

In the embodiment of the present disclosure, an example where the vehicle lamp 1 is used as a headlamp will be described, in which the headlamp irradiates light in a driving direction of a vehicle to secure a driver’s forward view when the vehicle is being operated in low-light conditions (e.g., at night or in a dark place such as a tunnel). However, the present disclosure is not limited thereto, and the vehicle lamp 1 of the present disclosure can be used not only as a headlamp but also as various lamps installed in vehicles, such as a tail lamp, a brake lamp, a fog lamp, a position lamp, a turn signal lamp, a daytime running lamp, a backup lamp, and the like.

When the vehicle lamp 1 of the present disclosure is used as a headlamp, it may form a low beam pattern in which the light is irradiated below a predetermined cutoff line to avoid dazzling drivers of vehicles ahead such as preceding vehicles or oncoming vehicles. Alternatively, the vehicle lamp 1 of the present disclosure may form a high beam pattern to secure a long-distance view ahead of the vehicle by irradiating the light relatively upward compared with the low beam pattern. In the embodiment of the present disclosure, an example where the vehicle lamp 1 forms a low beam pattern will be described.

In the embodiment of the present disclosure, an example where the lamp modules 100 are arranged in an up-down direction (e.g., generally vertical) will be described. However, this is merely an example to help understand the present disclosure, and the present disclosure is not limited thereto. The lamp modules 100 may be arranged in at least one arrangement direction depending on the layout or design of the vehicle lamp 1 of the present disclosure.

In addition, the lamp modules 100 may be disposed at more forward positions going from one side (e.g., a top side) toward the other side (e.g., a bottom side) in their arrangement direction. This configuration is to arrange the lamp modules 100 in conformity with the body line of the vehicle. However, the present disclosure is not limited to such a configuration, and the lamp modules 100 may be variously positioned along the body line of the vehicle.

In other words, the vehicle lamp 1 of the present disclosure may be disposed in an inner space formed by a lamp housing and a cover lens coupled to the lamp housing, and the lamp modules 100 may be arranged along the shape of an outer surface of the cover lens that forms part of the body contour of the vehicle.

One representative lamp module 100 among the plurality of lamp modules 100 will now be described as an example. However, similar description may be applied to other lamp modules 100.

Figure 7:
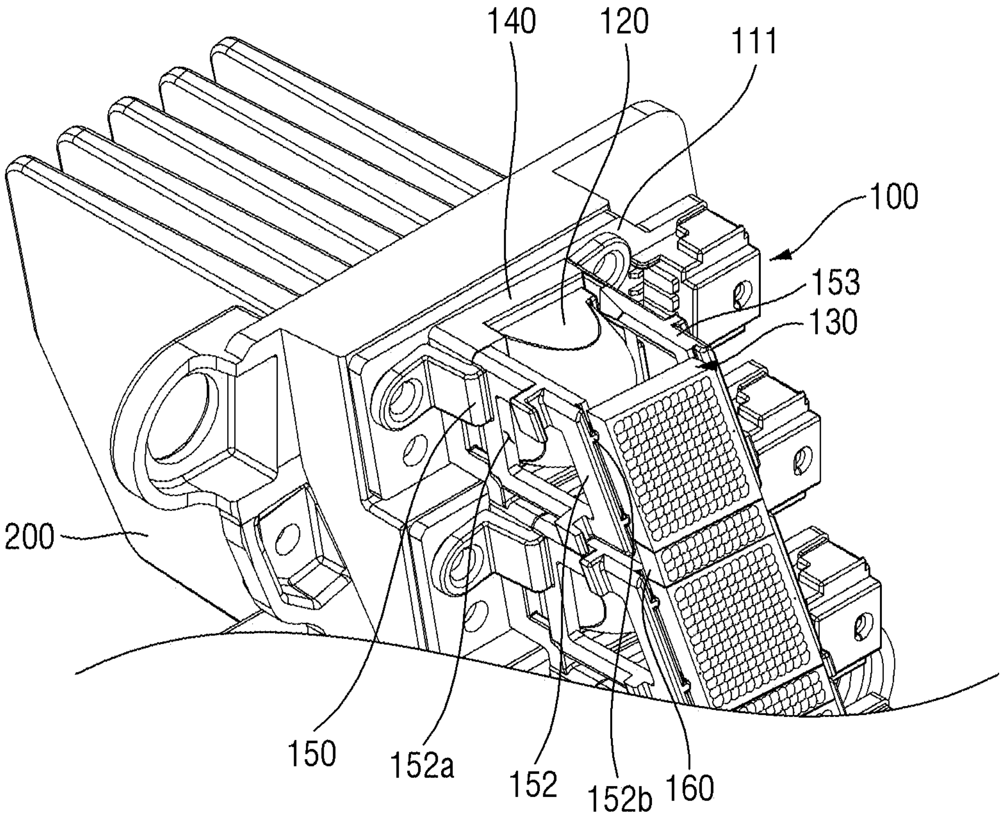
FIG. 7 is a perspective view of a lamp module according to an embodiment of the present disclosure.
Figure 8:
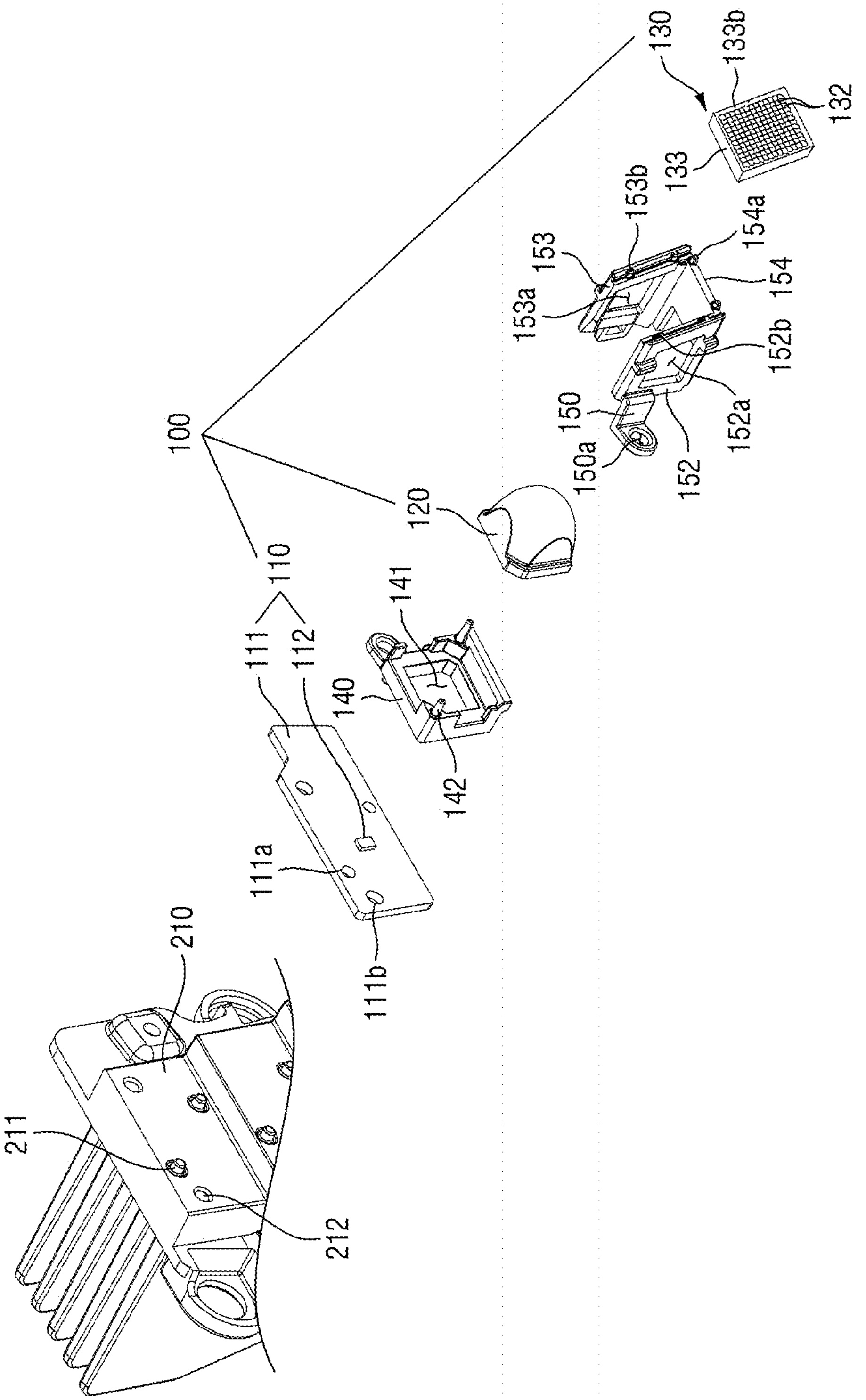
FIG. 8 is an exploded perspective view of the lamp module according to the embodiment of the present disclosure.
Figure 9:
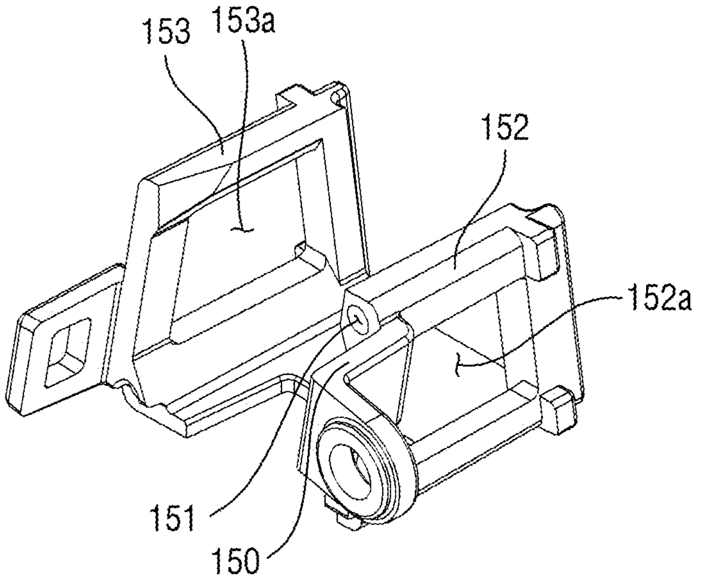
FIG. 9 is a perspective view of a second holder according to an embodiment of the present disclosure.

FIG. 7 is a perspective view of a lamp module 100 according to an embodiment of the present disclosure. FIG. 8 is an exploded perspective view of the lamp module 100 according to the embodiment of the present disclosure. FIG. 9 is a perspective view of a second holder 150 according to an embodiment of the present disclosure. FIGS. 7 through 9 illustrate an example of one of the lamp modules 100.

Referring to FIGS. 7 through 9, the lamp module 100 according to the embodiment of the present disclosure may include a light source unit 110, an optical path adjustment unit 120, and an optical unit 130.

The light source unit 110 may include at least one light source 112 installed on a substrate 111. In the embodiment of the present disclosure, an example where a light emitting diode (LED) is used as the at least one light source 112 will be described. However, the present disclosure is not limited thereto, and not only an LED but also various types of light sources such as a laser diode (LD) or a bulb may also be used as the at least one light source 112. In addition, an element such as a reflector, a prism, a mirror, a phosphor, and the like may be additionally used depending on the type of light source.

The light source unit 110 may be mounted on a mounting surface 210 of a heat sink 200 to facilitate dissipation of heat that is generated as the at least one light source 112 generates the light. The light emitting performance of the at least one light source 112 may deteriorate if the temperature rises due to the heat generated when the light is generated from the at least one light source 112.

At least one guide protrusion 211 which is to be inserted into at least one guide groove 111*a* formed in the substrate 111 and at least one coupling groove 212 to which a coupling member such as a screw is to be coupled may be formed on the mounting surface 210 of the heat sink 200 to align the mounting position of the substrate 111. An end of the coupling member may pass through at least one coupling aperture 111*b* formed in the substrate 111 and then may be coupled to the coupling groove 212.

In the embodiment of the present disclosure, an example where the substrate 111 is mounted on the heat sink 200 by a coupling member is described. However, the present disclosure is not limited thereto, and the substrate 111 may be mounted on the heat sink 200 not only by screw-coupling but also by hook-coupling or using an adhesive.

The optical path adjustment unit 120 may be disposed in front of the light source unit 110 so that the light emitted forward from the light source unit 110 may be incident on the optical path adjustment unit 120. The optical path adjustment unit 120 may guide the light generated from the light source unit 110 to be incident on the optical unit 130 with a minimal loss by adjusting the path of the light incident from the light source unit 110.

Here, the light path adjustment unit 120 may be disposed in front of the light source unit 110 based on the assumption that the light is irradiated forward from the vehicle lamp 1 of the present disclosure. However, the actual direction meant by "forward" may vary depending on the position and/or direction of installation for the vehicle lamp 1 of the present disclosure.

In the embodiment of the present disclosure, an example where an aspheric lens is used as the optical path adjustment unit 120 to convert the light, which is generated from the light source unit 110 and has a predetermined light irradiation angle, into a parallel light beam will be described. However, the present disclosure is not limited thereto, and not only an aspheric lens but also various types of optical elements such as a reflector or a Fresnel lens may be used as the optical path adjustment unit 120 to convert the light incident from the light source unit 110 into a parallel light beam.

The optical path adjustment unit 120 may be supported by a first holder 140 coupled directly or indirectly to the heat sink 200 and may be disposed in front of the light source unit 110. When the first holder 140 is directly coupled to the heat sink 200, it may be understood that the first holder 140 may be directly coupled to the heat sink 200 by screw-coupling, hook-coupling, or using an adhesive. When the first holder 140 is indirectly coupled to the heat sink 200, it may be understood that the first holder 140 may be coupled to a separate member that is in turn coupled to the heat sink 200.

The first holder 140 may have a hollow 141 through which the light generated from the at least one light source 112 may pass. Due to the hollow 141, the light generated from the at least one light source 112 may be incident to the optical path adjustment unit 120. In addition, the first holder 140 may include at least one coupling rib 142 formed on an edge of the hollow 141 to couple the first holder 140 to the second holder 150 configured to support the optical unit 130. The at least one coupling rib 142 may be inserted into at least one rib groove 151 formed in the second holder 150, thereby coupling the first holder 140 and the second holder 150 to each other.

In the embodiment of the present disclosure, an example where at least one coupling rib 142 is formed in the first holder 140 and at least one rib groove 151 is formed in the second holder 150 is described. However, the present disclosure is not limited thereto, and the at least one coupling rib 142 may be formed in the second holder 150 and the at least one rib groove 151 may be formed in the first holder 140.

Here, the second holder 150 may have at least one through hole 150*a* through which an end of a coupling member, which passes through the at least one coupling aperture 111*b* described above, passes. The end of the coupling member may pass through the at least one through hole 150*a* and the at least one coupling aperture 111*b* and then may be coupled and fixed to the coupling groove 212 formed in the mounting surface 210 of the heat sink 200. In addition, the respective first holders 140 of the plurality of lamp modules 100 may be individually formed so that they are separated from one another. Alternatively, the first holders 140 of the lamp modules 100 adjacent to one another in the arrangement direction of the lamp modules 100 among the lamp modules 100 may be integrally connected to one another.

The second holder 150 may be coupled to the first holder 140 to fix the position of the optical unit 130. The second holder 150 may have both sides open along a direction in which the light travels from the optical path adjustment unit 120 to the optical unit 130, so that the light guided by the optical path adjustment unit 120 may enter the optical unit 130. In addition, a first sidewall portion 152 and a second sidewall portion 153 for supporting the optical unit 130 may be respectively formed on both sides of the second holder 150 in a direction perpendicular to the arrangement direction of the lamp modules 100.

Here, at least one of the first sidewall portion 152 or the second sidewall portion 153 may have an opening 152*a* or 153*a* to allow a portion of the light guided by the optical path adjustment unit 120 toward the optical unit 130 to pass therethrough. The openings 152*a* and 153*a* may allow the light generated from the light source unit 110 to be visible even when the vehicle lamp 1 of the present disclosure is viewed from the side as well as from the front. This configuration will be described in more detail later.

In addition, the first sidewall portion 152 and the second sidewall portion 153 may be formed such that at least one of both ends (e.g., an upper end or a lower end) of a front end of the first sidewall portion 152 and a corresponding one of both ends (e.g., an upper end or a lower end) of a front end of the second sidewall portion 153 in the arrangement direction of the lamp modules 100 are separated from each other. This configuration may prevent the formation of an unnecessary shadow area between the lamp modules 100, which will be described in more detail later.

In the embodiment of the present disclosure, since an example where the lamp modules 100 are arranged in the up-down direction is described, the first sidewall portion 152 and the second sidewall portion 153 may be spaced apart from each other in a left-right direction (e.g., horizontal direction). Accordingly, respective upper ends and/or lower ends of the first sidewall portion 152 and the second sidewall portion 153 may be separated from each other.

At least one first fixing rib 152*b* that protrudes toward the front end of the second sidewall portion 153 may be formed at the front end of the first sidewall portion 152. Similarly, at least one second fixing rib 153*b* that protrudes toward the front end of the first sidewall portion 152 may be formed at the front end of the second sidewall portion 153. Since both sides of the optical unit 130 are inserted between the at least one first fixing rib 152*b* and the at least one second fixing rib 153*b*, the position of the optical unit 130 may be fixed.

Figure 10:
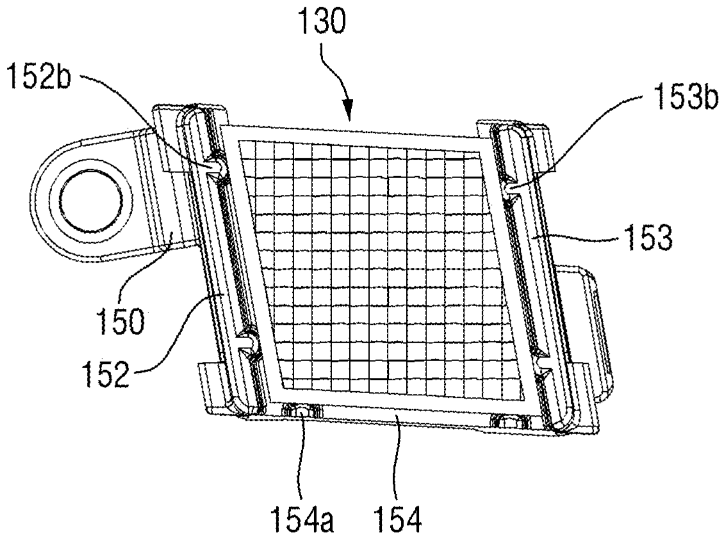
FIG. 10 is a front view of an optical unit located in the second holder according to the embodiment of the present disclosure.

In addition, the respective lower ends of the front ends of the first sidewall portion 152 and the second sidewall portion 153 may be connected by a connection portion 154, and the connection portion 154 may include at least one support rib 154*a* that supports a lower side of the optical unit 130. In this case, as illustrated in FIG. 10, the position of the optical unit 130 may be fixed by the at least one first fixing rib 152*b*, the at least one second fixing rib 153*b*, and the at least one support rib 154*a*.

It has been described above that the upper ends and/or lower ends of the first sidewall portion 152 and the second sidewall portion 153 are separated from each other. In the embodiment shown in the figures, since the respective lower ends of the front ends of the first sidewall portion 152 and the second sidewall portion 153 are connected by the connection portion 154, it may be understood that the respective upper ends of the front ends of the first sidewall portion 152 and the second sidewall portion 153 may be separated from each other.

The optical unit 130 may transmit the light guided by the optical path adjustment unit 120 to form a beam pattern suitable for the use of the vehicle lamp 1 of the present disclosure.

Figure 11:
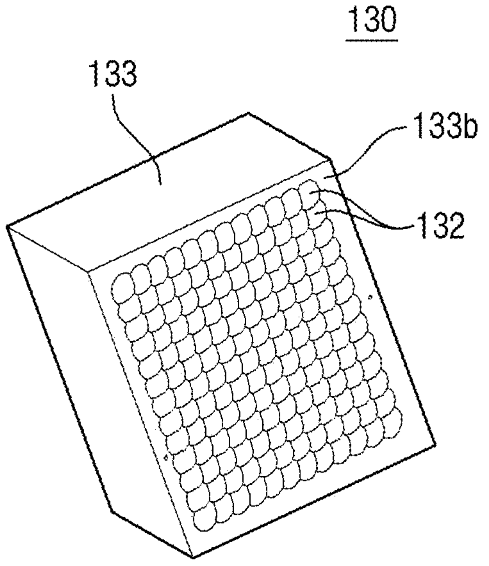
FIGS. 11 and 12 are perspective views of an optical unit according to an embodiment of the present disclosure.
Figure 12:
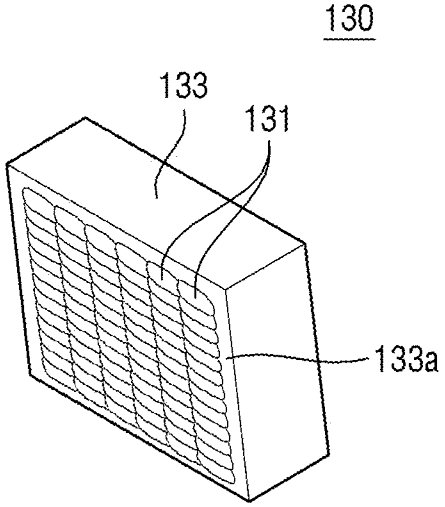
Figure 13:
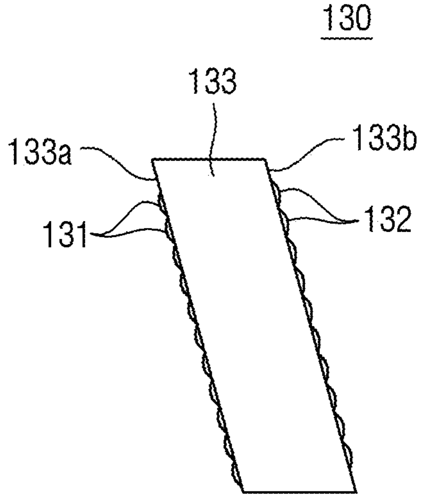
FIG. 13 is a side view of the optical unit according to the embodiment of the present disclosure.

FIGS. 11 and 12 are perspective views of an optical unit 130 according to an embodiment of the present disclosure. FIG. 13 is a side view of the optical unit 130 according to the embodiment of the present disclosure. Referring to FIGS. 11 through 13, the optical unit 130 according to the embodiment of the present disclosure may include a plurality of incident lenses 131, a plurality of exit lenses 132, and a light transmitting portion 133.

The light guided by the optical path adjustment unit 120 may be incident to the plurality of incident lenses 131, and incident surfaces of the plurality of incident lenses 131 may collectively form an incident surface of the optical unit 130. In addition, the light incident to the incident lenses 131 may be output from the exit lenses 132, and exit surfaces of the plurality of exit lenses 132 may collectively form an exit surface of the optical unit 130.

Referring to FIGS. 11 and 12, an example where the incident lenses 131 have a semi-cylindrical shape that extends in one direction (e.g., horizontal direction) and where light incident on one of the incident lenses 131 proceeds to a plurality of exit lenses 132 adjacent to one another in the extending direction of the incident lenses 131 among the plurality of exit lenses 132 is described. However, this is merely an example used to help understand the present disclosure, and the present disclosure is not limited thereto. The incident lenses 131 and the exit lenses 132 may correspond to each other in a one-to-one, one-to-many, many-to-one, or many-to-many manner based on the light distribution characteristics of a beam pattern to be formed by the vehicle lamp 1 of the present disclosure, for example, depending on the position, size, shape, and/or brightness of an area to which the light is to be irradiated.

The plurality of incident lenses 131 and the plurality of exit lenses 132 may be formed on an incident surface 133*a* and an exit surface 133*b* of the light transmitting portion 133, respectively. In some embodiments, one light transmitting portion 133 may be formed, and in some other embodiments, a plurality of light transmitting portions 133 may be respectively formed for each of the incident lenses 131 and its corresponding exit lenses 132 and may be disposed adjacent to one another.

Depending on the beam pattern to be formed by the vehicle lamp 1 of the present disclosure, the optical unit 130 may further include a plurality of shields for blocking a portion of the light that proceeds to each of the exit lenses 132. The shields may be disposed on the incident surface 133*a*, the exit surface 133*b*, or between the incident surface 133*a* and the exit surface 133*b* of the light transmitting portion 133. When the shields are disposed between the incident surface 133*a* and the exit surface 133*b* of the light transmitting portion 133, a plurality of light transmitting portions 133 may be formed for the incident lenses 131 and the exit lenses 132, respectively, and the shields may be disposed between the corresponding incident lenses 131 and exit lenses 132.

In the embodiment of the present disclosure, the optical unit 130 may be tilted at a predetermined angle such that one of both sides (e.g., a top or a bottom) in at least one direction is disposed more forward than the other side. Like the arrangement direction of the lamp modules 100 described above, this configuration is to allow the exit surface of the optical unit 130 to conform with the body contour of the vehicle to achieve a more unified appearance.

For example, when the outer surface of the cover lens has a substantially flat shape facing forward, the exit surface of the optical unit 130 may also lie on a vertical plane. However, when the outer surface of the cover lens is inclined or has a curvature in at least one direction, the exit surface of the optical unit 130 may also be tilted in the at least one direction according to the shape of the outer surface of the cover lens to provide a more unified appearance.

Here, when the optical unit 130 is tilted in at least one direction, incident and exit lenses corresponding to each other among the plurality of incident lenses 131 and the plurality of exit lenses 132 may be staggered with each other in at least one direction. Due to the staggered configuration, the light emitted from the optical unit 130 may be directed forward (e.g., substantially parallel with an optical axis of the vehicle lamp 1) although the optical unit 130 is tilted with respect to the optical axis of the vehicle lamp 1.

Figure 14:
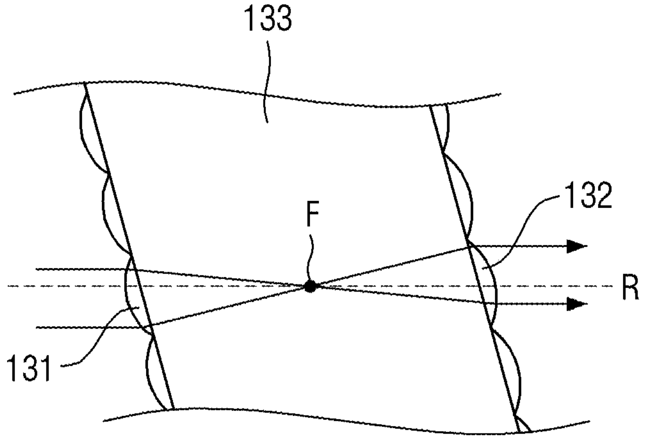
FIG. 14 is a schematic diagram illustrating an optical path of the optical unit according to the embodiment of the present disclosure.

For example, when the optical unit 130 is tilted such that a lower side protrudes more forward than an upper side, incident and exit lenses corresponding to each other among the plurality of incident lenses 131 and the plurality of exit lenses 132 may be staggered in the up-down direction as illustrated in FIG. 14. In this case, the corresponding incident and exit lenses may be arranged asymmetrically in the up-down direction with respect to a reference line R that passes in a front-back direction through a focal point F of the incident and exit lenses corresponding to each other. In other words, the centerline that horizontally passes through the center of the incident lens and the centerline that horizontally passes through the center of the corresponding exit lens(es) may be spaced apart vertically.

As such, among the corresponding incident and exit lenses, the portion of an incident lens below the reference line R may be larger than the portion of the incident lens above the reference line R. Conversely, the portion of an exit lens above the reference line R may be larger than the portion of the exit lens below the reference line R.

When the respective optical units 130 of the lamp modules 100 are disposed in the arrangement direction of the lamp modules 100, a space may be formed between the respective optical units 130 of the lamp modules 100 due to manufacturing tolerances or assembly tolerances. Since such space can form an unnecessary shadow area (e.g., a dark band or a dark spot) appearing between the lamp modules 100, an auxiliary optical unit 160 may be disposed between each pair of the plurality of optical units 130 of the lamp modules 100.

Figure 15:
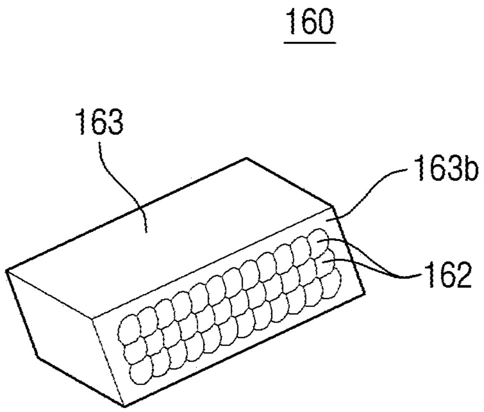
FIGS. 15 and 16 are perspective views of an auxiliary optical unit according to an embodiment of the present disclosure.
Figure 16:
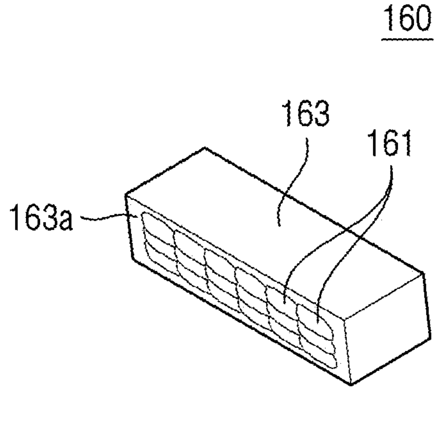

FIGS. 15 and 16 are perspective views of an auxiliary optical unit 160 according to an embodiment of the present disclosure. Referring to FIGS. 15 and 16, the auxiliary optical unit 160 according to the embodiment of the present disclosure may include a plurality of incident lenses 161, a plurality of exit lenses 162, and a light transmitting portion 163, similar to the optical unit 130 described above. The incident lenses 161 may be formed on an incident surface 163*a* of the light transmitting portion 163, and the exit lenses 162 may be formed on an exit surface 163*b* of the light transmitting portion 163. Incident surfaces of the incident lenses 161 may collectively form an incident surface of the auxiliary optical unit 160, and exit surfaces of the exit lenses 162 may collectively form an exit surface of the auxiliary optical unit 160.

In the embodiment of the present disclosure, an example where the incident lenses 161 and the exit lenses 162 of the auxiliary optical unit 160 have substantially the same shapes as the incident lenses 131 and the exit lenses 132 of the optical unit 130 will be described. However, this is to allow the vehicle lamp 1 of the present disclosure to have a substantially congruous appearance, and the present disclosure is not limited thereto. The incident lenses 161 and the exit lenses 162 of the auxiliary optical unit 160 may also have different shapes from the incident lenses 131 and the exit lenses 132 of the optical unit 130.

In addition, the auxiliary optical unit 160 may be disposed to have a tilting direction and a tilting angle corresponding to those of the optical unit 130 of each of the lamp modules 100. This configuration brings about the same effect as the effect that may be obtained when the exit surface of the optical unit 130 and the exit surface of the auxiliary optical unit 160 in each of the lamp modules 100 are formed as a single exit surface. Therefore, a more congruous and unified appearance can be realized as a whole.

Figure 17:
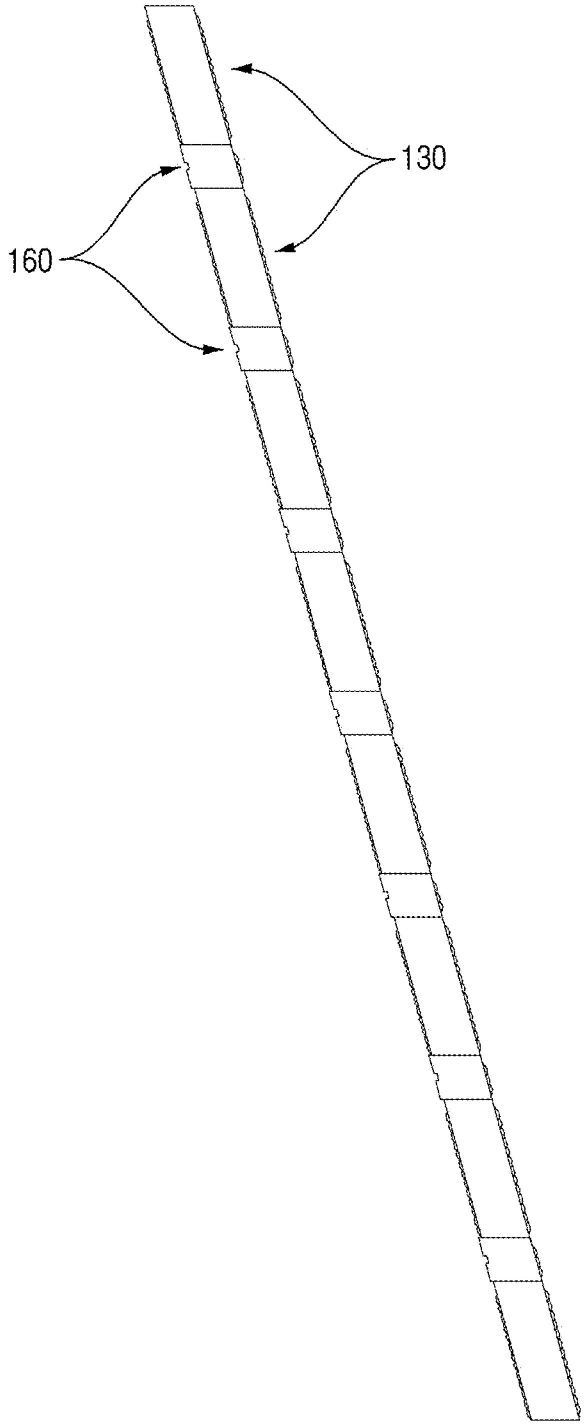
FIG. 17 is a side view of optical units and auxiliary optical units according to an embodiment of the present disclosure.

The auxiliary optical unit 160 described above may be disposed between the optical units 130 of the lamp modules 100 adjacent to each other in the arrangement direction of the lamp modules 100 as illustrated in FIG. 17. Therefore, the auxiliary optical unit 160 may prevent the formation of unnecessary shadow areas. In addition, as described above, at least one of both sides of the front end of the first sidewall portion 152 and a corresponding one of both sides of the front end of the second sidewall portion 153 in the arrangement direction of the lamp modules 100 may be separated from each other. Therefore, a portion of light that proceeds toward the optical unit 130 by the optical path adjustment unit 120 may enter the auxiliary optical unit 160, thereby preventing an unnecessary shadow area from appearing between each pair of the optical units 130 of the lamp modules 100.

Figure 18:
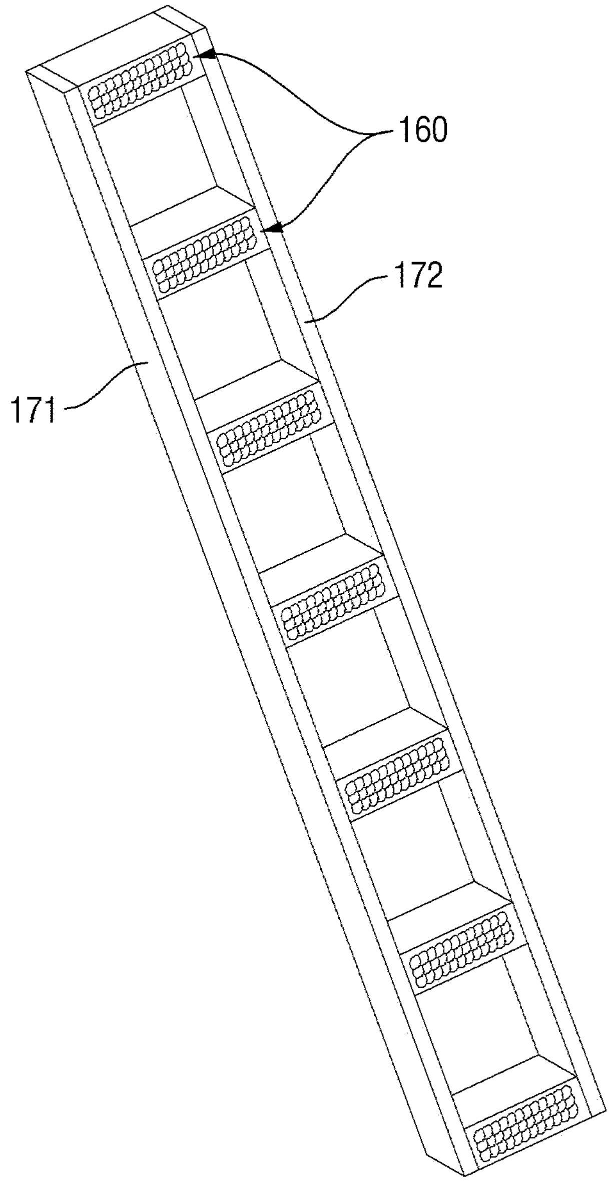
FIG. 18 is a perspective view of auxiliary optical units connected to frame portions according to an embodiment of the present disclosure.

In the embodiment of the present disclosure, an example where the auxiliary optical units 160 disposed between the pair of optical units 130 of the lamp modules 100 are individually formed is described. However, the present disclosure is not limited thereto. As shown in FIG. 18, both ends of each of the auxiliary optical units 160 disposed between the optical units 130 of the lamp modules 100 may be connected with frame portions 171 and 172, thereby forming a ladder shape as a whole. Therefore, the auxiliary optical units 160 disposed between the respective optical units 130 of the lamp modules 100 may be integrally formed. Due to this configuration, the plurality of auxiliary optical units 160 may be assembled to the plurality of optical units 130 of the plurality of lamp modules 100 in a single step, thereby making the assembly process easier.

Figure 19:
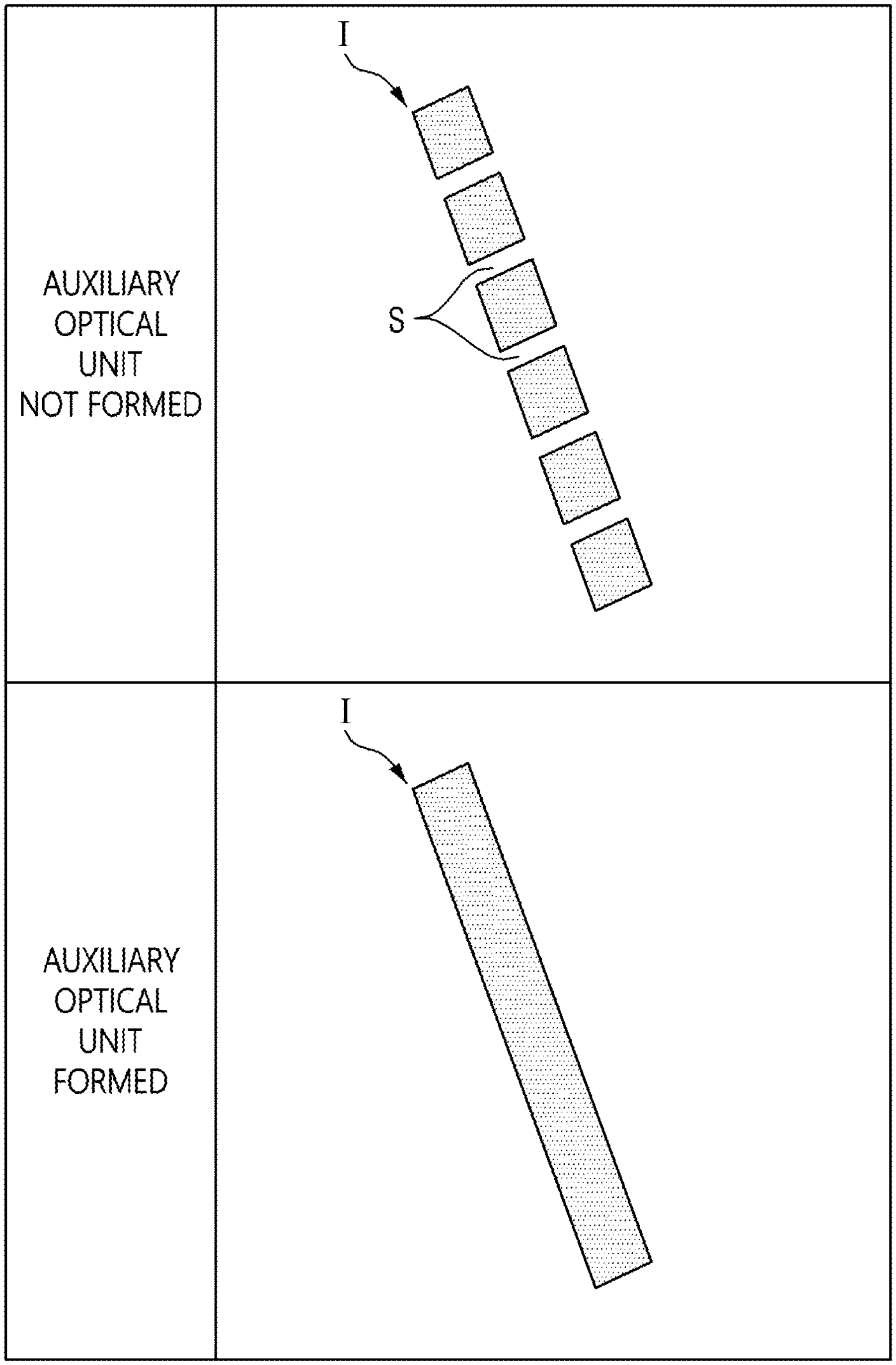
FIG. 19 is a schematic diagram illustrating an image formed by light emitted from the vehicle lamp according to the embodiment of the present disclosure.

As described above, when the auxiliary optical units 160 are disposed between the optical units 130 of the lamp modules 100, it is possible to prevent an unnecessary shadow area S from being formed in an image I by light emitted from each of the lamp modules 100 as illustrated in FIG. 19.

The vehicle lamp 1 of the present disclosure may further include a light guide unit 300, which guides the light emitted from the plurality of lamp modules 100.

Figure 20:
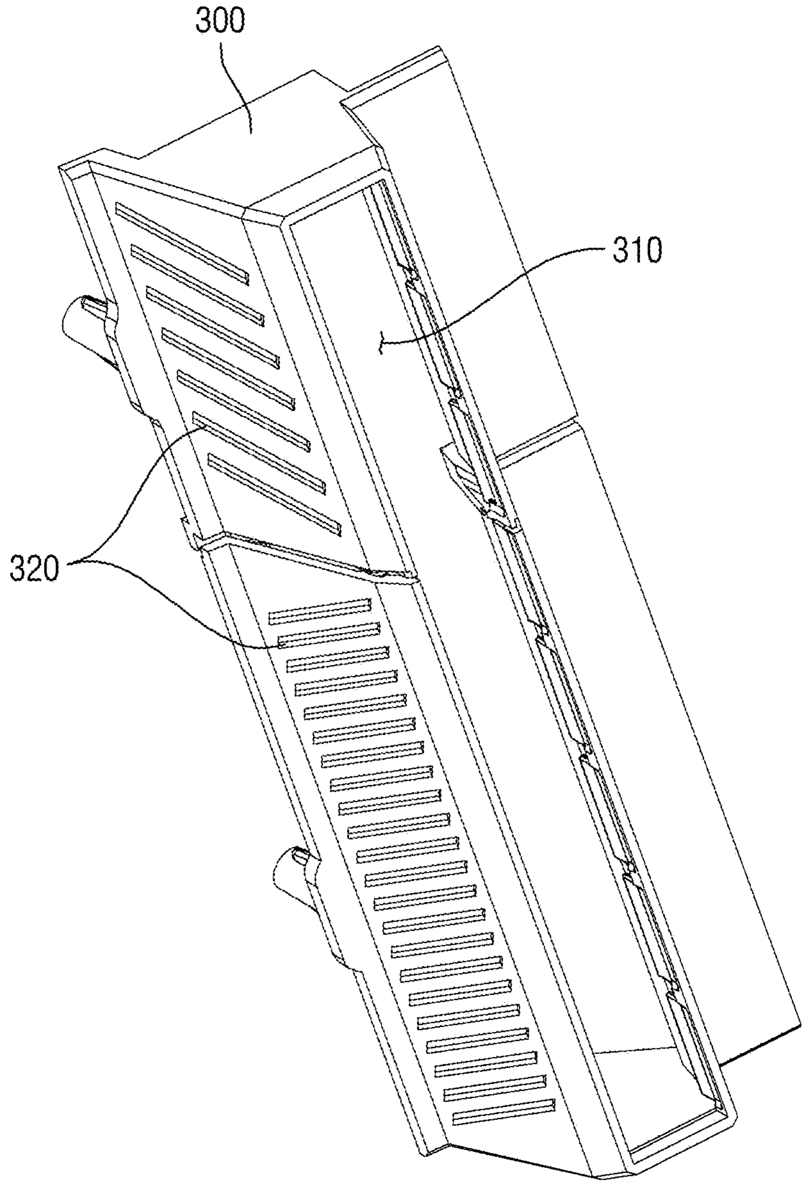
FIG. 20 is a perspective view of a light guide unit according to an embodiment of the present disclosure.

FIG. 20 is a perspective view of the light guide unit 300 according to an embodiment of the present disclosure. Referring to FIG. 20, in the embodiment of the present disclosure, the light guide unit 300 may have a passage aperture 310 through which the light emitted from the lamp modules 100 passes. Therefore, the light guide unit 300 may be understood as a bezel or the like, which guides the light emitted from the lamp modules 100 while hiding the interior components from the outside.

Here, one or more opening apertures 320 through which the light passes may be formed around the passage aperture 310 of the light guide unit 300, and an image formed by the light that passes around the passage aperture 310 of the light guide unit 300 may be determined based on the number and/or shape of the opening apertures 320.

Here, the light may pass through the opening apertures 320 around the passage aperture 310 of the light guide unit 300 because the openings 152*a* and 153*a* are formed in the first sidewall portion 152 and the second sidewall portion 153 as described above. Therefore, an image formed by the light that passes through the opening apertures 320 of the light guide unit 300 may increase visibility and may improve the aesthetics when the vehicle lamp 1 of the present disclosure is viewed from the side as well as when viewed from the front.

In addition, the light guide unit 300 may further include a diffusion portion for diffusing the light that proceeds toward the opening apertures 320, and the diffusion portion may be implemented, for example, as a diffusion film attached to the light guide unit 300.

As described above, the vehicle lamp 1 of the present disclosure can realize a slim exterior design using the lamp modules 100 arranged in at least one direction and can prevent an unnecessary shadow area from appearing between the lamp modules 100 due to the use of the auxiliary optical units 160.

In concluding the detailed description, those skilled in the art will appreciate that many variations and modifications can be made to the exemplary embodiments without substantially departing from the principles of the present disclosure. Therefore, the disclosed embodiments are used in a generic and descriptive sense only and not for limitative purposes.

What is claimed is:

1. A vehicle lamp for forming a predetermined beam pattern using a plurality of lamp modules arranged in at least one direction, wherein each of the plurality of lamp modules comprises:
  - a light source unit that generates light;
  - an optical unit that is disposed in front of the light source unit and transmits the light from the light source unit so that at least a portion of the light incident to an incident surface of the optical unit is output through an exit surface thereof to form the predetermined beam pattern; and
  - an optical path adjustment unit that guides the light generated from the light source unit toward the optical unit by adjusting paths of the light,
  - wherein the exit surface of the optical unit of a first lamp module among the plurality of lamp modules is disposed more forward than the exit surface of the optical unit of a second lamp module adjacent to the first lamp module among the plurality of lamp modules to form a predetermined inclination angle between the optical units of the first and second lamp modules,
  - wherein an auxiliary optical unit is disposed between the optical units of the first and second lamp modules, and
  - wherein the auxiliary optical unit is tilted in the at least one direction by the predetermined inclination angle.

2. The vehicle lamp of claim 1, wherein the plurality of lamp modules are arranged in an up-down direction.

3. The vehicle lamp of claim 1, wherein the optical unit is tilted such that one of both sides in the at least one direction is disposed more forward than the other of the both sides.

4. The vehicle lamp of claim 1, wherein the optical unit comprises a plurality of incident lenses which form the incident surface and a plurality of exit lenses which form the exit surface and from which light incident to the plurality of incident lenses is output, and
  - wherein incident and exit lenses corresponding to each other among the plurality of incident lenses and the plurality of exit lenses are staggered with respect to each other in an arrangement direction of the plurality of lamp modules.

5. The vehicle lamp of claim 4, wherein both sides of the incident and exit lenses corresponding to each other are asymmetrical with respect to a reference line that passes in a front-back direction through a focal point of the incident and exit lenses corresponding to each other.

6. The vehicle lamp of claim 5, wherein in one of the incident and exit lenses corresponding to each other, a portion thereof disposed on a first side with respect to the reference line is larger than a portion thereof disposed on a second side with respect to the reference line, and
  - wherein in the other of the incident and exit lenses corresponding to each other, a portion thereof disposed on the second side with respect to the reference line is larger than a portion thereof disposed on the first side with respect to the reference line.

7. The vehicle lamp of claim 1, wherein each of the plurality of lamp modules further comprises:
  - a first holder that supports the optical path adjustment unit; and
  - a second holder that is coupled to the first holder and supports the optical unit.

8. The vehicle lamp of claim 7, wherein one of the first holder and the second holder includes at least one coupling rib, and the other thereof includes at least one rib groove into which the at least one coupling rib is inserted.

9. The vehicle lamp of claim 7, wherein the second holder comprises a first sidewall portion and a second sidewall portion that support both sides of the optical unit, and
  - wherein at least one of both ends of a front end of the first sidewall portion and a corresponding one of both ends of a front end of the second sidewall portion in an arrangement direction of the plurality of lamp modules are separated from each other.

10. The vehicle lamp of claim 9, wherein at least one of the first sidewall portion and the second sidewall portion has an opening through which a portion of the light guided by the optical path adjustment unit passes.

11. The vehicle lamp of claim 1, further comprising:

a light guide unit that guides the light emitted from the plurality of lamp modules, wherein the light guide unit has one or more opening apertures, through which a portion of the light guided by the optical path adjustment unit passes, the one or more opening apertures being disposed around a passage aperture through which the light emitted from the plurality of lamp modules passes.

12. The vehicle lamp of claim 11, wherein the light guide unit further comprises a diffusion portion for diffusing light that proceeds to the opening aperture.

13. The vehicle lamp of claim 1, further comprising one or more frame portions to which both sides of the auxiliary optical unit disposed between the optical units of the adjacent lamp modules are connected.

14. A vehicle lamp for forming a predetermined beam pattern using a plurality of lamp modules arranged in at least one direction, wherein each of the plurality of lamp modules comprises:

a light source unit that generates light;

an optical unit that is disposed in front of the light source unit and transmits the light from the light source unit so that at least a portion of the light incident to an incident surface of the optical unit is output through an exit surface thereof to form the predetermined beam pattern; and an optical path adjustment unit that guides the light generated from the light source unit toward the optical unit by adjusting paths of the light, wherein the exit surface of the optical unit of any one of the plurality of lamp modules is disposed more forward than the exit surface of the optical unit of another one of the plurality of lamp modules, wherein the optical unit comprises a plurality of incident lenses which form the incident surface and a plurality of exit lenses which form the exit surface and from which light incident to the plurality of incident lenses is output, and wherein incident and exit lenses corresponding to each other among the plurality of incident lenses and the plurality of exit lenses are staggered from each other in an arrangement direction of the plurality of lamp modules with respect to a reference line that passes in a front-back direction through a focal point of the incident and exit lenses corresponding to each other.

15. The vehicle lamp of claim 14, wherein both sides of the incident and exit lenses corresponding to each other are asymmetrical with respect to the reference line.

16. The vehicle lamp of claim 15, wherein in one of the incident and exit lenses corresponding to each other, a portion thereof disposed on a first side with respect to the reference line is larger than a portion thereof disposed on a second side with respect to the reference line, and wherein in the other of the incident and exit lenses corresponding to each other, a portion thereof disposed on the second side with respect to the reference line is larger than a portion thereof disposed on the first side with respect to the reference line.

* * * * *